United States Patent
Eisenmann et al.

(10) Patent No.: US 10,719,920 B2
(45) Date of Patent: Jul. 21, 2020

(54) ENVIRONMENT MAP GENERATION AND HOLE FILLING

(71) Applicant: Adobe Inc., San Jose, CA (US)

(72) Inventors: Jonathan Eisenmann, San Francisco, CA (US); Zhe Lin, Fremont, CA (US); Matthew Fisher, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/188,479

(22) Filed: Nov. 13, 2018

(65) Prior Publication Data

US 2020/0118253 A1    Apr. 16, 2020

Related U.S. Application Data

(60) Provisional application No. 62/745,220, filed on Oct. 12, 2018.

(51) Int. Cl.
*G06T 5/00*    (2006.01)
*G06T 5/50*    (2006.01)
(Continued)

(52) U.S. Cl.
CPC .............. *G06T 5/005* (2013.01); *G06T 3/005* (2013.01); *G06T 5/50* (2013.01); *G06T 11/003* (2013.01); *G06T 15/10* (2013.01)

(58) Field of Classification Search
CPC .......... G06T 5/005; G06T 5/50; G06T 3/005; G06T 3/4038; G06T 3/4046; G06T 5/001;
(Continued)

(56) References Cited

U.S. PATENT DOCUMENTS 8,160,391 B1 *    4/2012    Zhu .................. G06T 5/005
                                            345/629
2012/0134587 A1 *    5/2012    Gobert .............. G06T 3/0062
                                            382/173
(Continued)

OTHER PUBLICATIONS

Zeyuan Chen, Shaoliang Nie, Tianfu Wu, and Christopher G Healey. High resolution face completion with multiple controllable attributes via fully end-to-end progressive generative adversarial networks. arXiv preprint arXiv:1801.07632, Jan. 23, 2018. (Year: 2018).*

(Continued)

*Primary Examiner* — Ke Xiao
*Assistant Examiner* — Andrew Shin
(74) *Attorney, Agent, or Firm* — Kilpatrick Townsend & Stockton LLP

(57) ABSTRACT

In some embodiments, an image manipulation application receives a two-dimensional background image and projects the background image onto a sphere to generate a sphere image. Based on the sphere image, an unfilled environment map containing a hole area lacking image content can be generated. A portion of the unfilled environment map can be projected to an unfilled projection image using a map projection. The unfilled projection image contains the hole area. A hole filling model is applied to the unfilled projection image to generate a filled projection image containing image content for the hole area. A filled environment map can be generated by applying an inverse projection of the map projection on the filled projection image and by combining the unfilled environment map with the generated image content for the hole area of the environment map.

18 Claims, 12 Drawing Sheets

(51) Int. Cl.
*G06T 15/10* (2011.01)
*G06T 3/00* (2006.01)
*G06T 11/00* (2006.01)

(58) Field of Classification Search
CPC ....... G06T 11/003; G06T 15/10; G06T 15/20; G06T 3/40; G06T 3/60; G06T 2207/20081; G06T 2207/20084; G06T 2207/20212; G06T 2207/20221; G06T 2215/08; G06T 2215/12
See application file for complete search history.

(56) References Cited

U.S. PATENT DOCUMENTS

2018/0122044 A1    5/2018   Bai et al.
2019/0362539 A1    11/2019  Kurz et al.

OTHER PUBLICATIONS

Search and Examination Report from Related GB Application GB1912592.1, dated Feb. 24, 2020 5 pages.

* cited by examiner

ORACLE REGION 702

ORACLE REGION 702

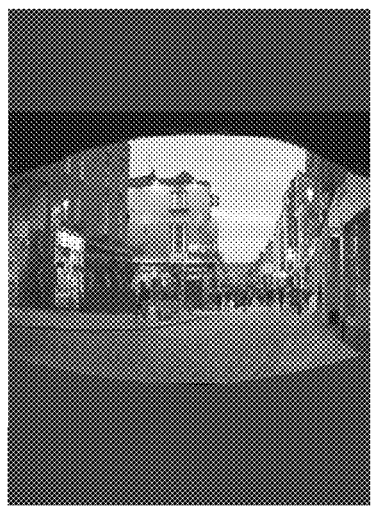 
FIG. 8A  FIG. 8B
FIG. 8C
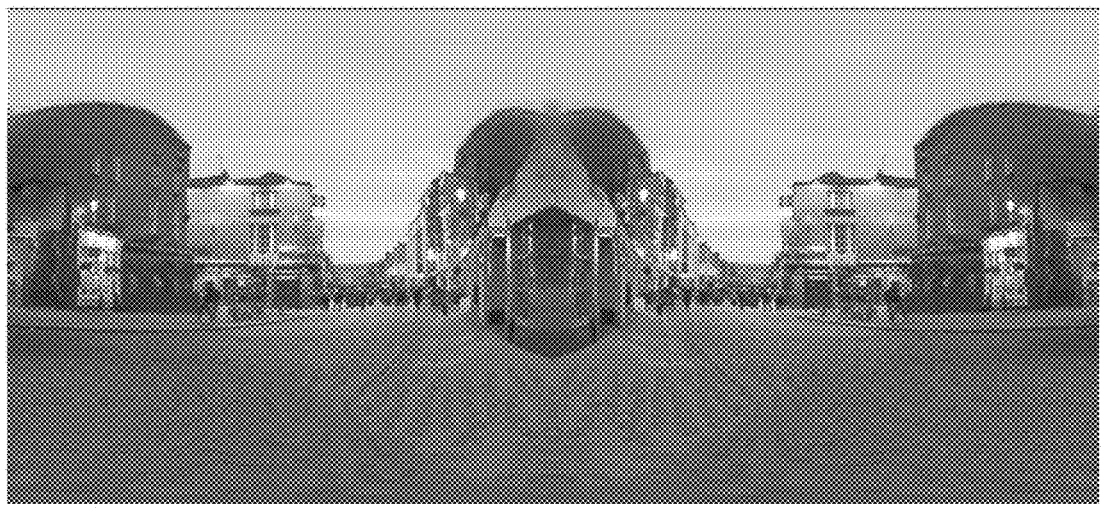
FIG. 8D

ENVIRONMENT MAP GENERATION AND HOLE FILLING

CROSS REFERENCE TO RELATED APPLICATIONS

This application claims priority to U.S. Provisional Application No. 62/745,220, entitled "Environment Map Generation and Hole Filling," filed on Oct. 12, 2018, which is hereby incorporated in its entirety by this reference.

TECHNICAL FIELD

This disclosure relates generally to computer-implemented methods and systems for computer graphics processing. Specifically, the present disclosure involves generating and hole filling an environment map based on an image.

BACKGROUND

Some image manipulation applications provide functions that allow a user to combine a two-dimensional ("2D") background image with three-dimensional ("3D") objects to generate a composed image showing the 3D objects positioned in an environment illustrated by the 2D background image. To create photorealistic composed images, a spherical environment can be created to provide a visual impression that the 3D objects are surrounded by a realistic environment. A 360-degree panoramic image depicting the spherical environment surrounding the 3D objects is referred to herein as an "environment map."

Creating an environment map, however, is challenging. One of the reasons is that the input 2D background image, based on which the environment map is to be generated, typically contains much less information than an ideal environment map would require. For example, the input 2D background image is typically taken by a camera with a limited field of view, from a particular angle, and at a certain aspect ratio. As a result, the 2D background image contains only a small portion of the actual environment surrounding the camera. Generating the environment map based on such a 2D background image would require extrapolating or creating image content that cannot be observed from the input 2D background image.

SUMMARY

Certain embodiments involve generating, based on a two-dimensional background image, an environment map and using a machine learning model to generate visually realistic image content for a hole area of the environment map that cannot be obtained directly from the two-dimensional background image. In one example, an image manipulation application receives a two-dimensional background image and projects the background image onto a sphere to generate a sphere image. Based on the sphere image, the image manipulation application generates an unfilled environment map containing a hole area lacking image content. The unfilled environment map having a field of view that is larger than a field of view represented by the sphere image. A portion of the unfilled environment map can be projected to an unfilled projection image using a map projection. The unfilled projection image contains at least a portion of the hole area. A hole filling model is applied to the unfilled projection image to generate a filled projection image containing image content for the portion of the hole area and image content of the unfilled projection image. The image manipulation application can projects the filled projection image onto the sphere to generate image content for the hole area of the environment map using the an inverse projection of the map projection. A filled environment map can be generated by combining the unfilled environment map with the generated image content for the hole area of the environment map.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIGS. 8A-8D depict examples of actual images generated in an environment map generation and hole filling process, in accordance with certain embodiments of the present disclosure.

DETAILED DESCRIPTION

Figure 1:
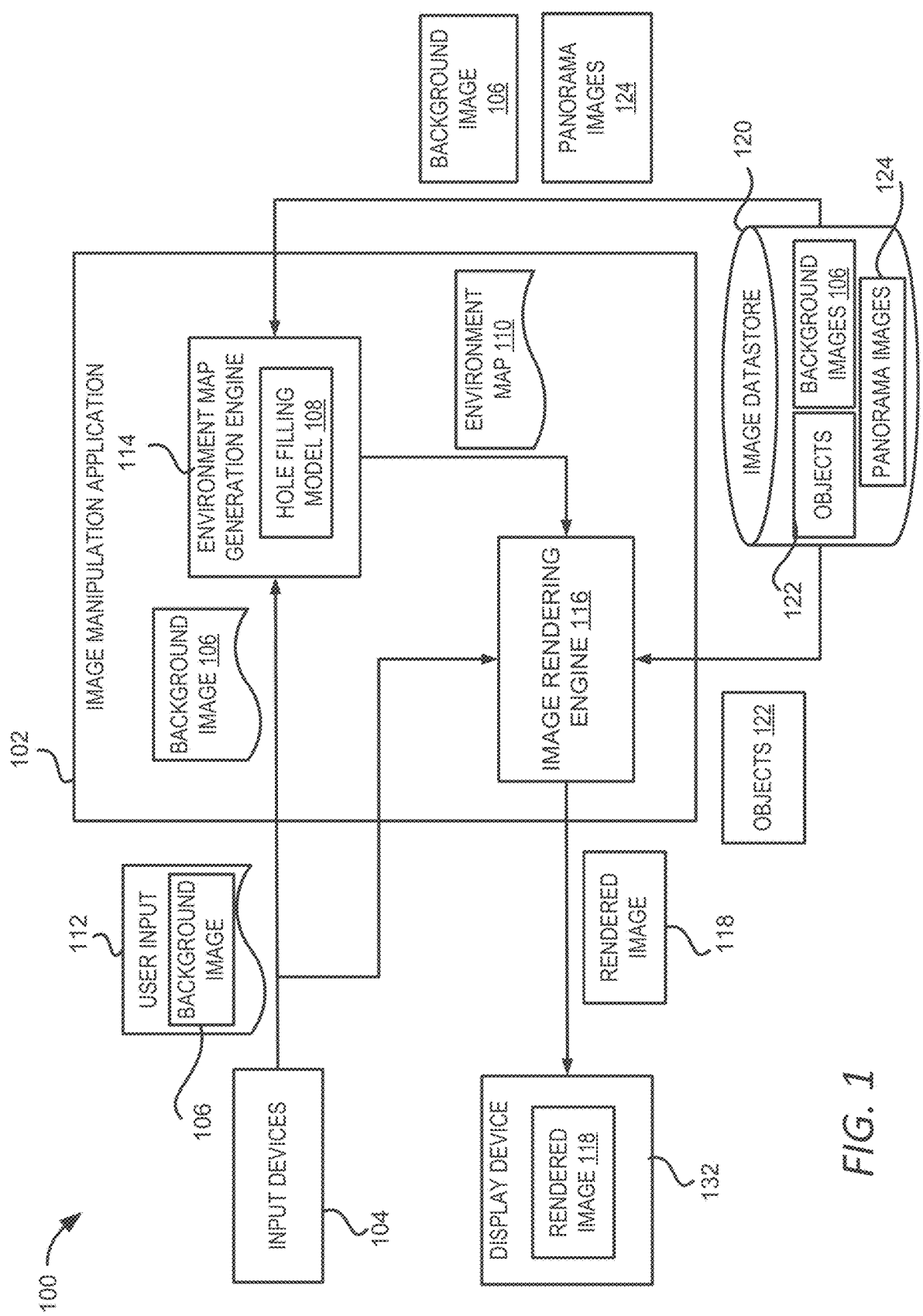
FIG. 1 depicts an example of a computing environment for using environment map generation and hole filling in an image manipulation application to render composed images, according to certain embodiments of the present disclosure.

The present disclosure involves generating and hole filling an environment map based on a 2D background image. As discussed above, generating an environment map based on a 2D background image might involve extrapolating or producing image content that has not been observed from the 2D background image. The area of the environment map where there is no corresponding image content from the 2D background image is referred to herein as the "hole area" of the environment map, and producing the image content for the hole area of the environment map is referred to herein as "hole filling" the environment map.

Existing environment map generation and hole filling methods often operate without the global layout or semantic knowledge of a scene, and thus these methods fill the hole area of the environment map using a local, patch-based approach. These methods are not robust in certain scenarios, such as an outdoor scene that should be illuminated by the sky from above but have insufficient sky patches near the top border of the background image. The top region of the spherical environment map is often filled with patches of a wrong color by these methods, creating overly dark or strangely colorized ambient lighting in the composed image.

Certain embodiments described herein address these limitations by creating an environment map based on a hole filling model and by using projection techniques that reduces the overall distortion introduced by the process. For instance, an environment map generation engine transforms the background image into an environment map in a 3D space using image processing techniques such as 2D to 3D image mapping and intelligent scaling. In order to fill the hole area of the environment map, the environment map generation engine applies an additional projection operation on the environment map so that the hole area can be filled with visually realistic image content generated using a machine learning model. The environment map generation engine then applies an inverse projection to transform the image content back to the 3D space and uses the created image content to fill the hole area of the environment map.

As described herein, certain embodiments provide improvements in image processing by generating an environment map based on a single 2D image and filling the hole area of the environment map with image content that is visually realistic with regard to the content of the 2D image. Such environment map can be used to generate a photorealistic composed image based on a 2D image and 3D objects. Because the environment map can be generated based on a single 2D image, an image manipulation application 102 can avoid using computationally expensive environment map generation methods, such as reconstructing a 3D model of the environment, while maintaining a realistic appearance of the generated environment map. As a result, embodiments described herein improve the image manipulation by reducing the consumption of computing resources, such as CPU times and memory spaces.

The following non-limiting example is provided to introduce certain embodiments. In this example, an environment map generation engine receives a 2D background image. The environment map generation engine 114 projects the background image onto a sphere in a 3D space. The projected image is referred to herein as a "sphere image," which covers a portion of the sphere. Based on the sphere image, the environment map generation engine generates an environment map that covers the entire sphere. The environment map thus has a field of view larger than that of the sphere image. The area in the environment map where no image content can be obtained from the sphere image forms the hole area of the environment map. An environment map having a hole area that has not been filled with image content is referred to herein as an "unfilled environment map."

To fill the hole area, the environment map generation engine projects a portion of the unfilled environment map to a projection image using a map projection, such as gnomonic projection. The projection image contains the hole area of the unfilled environment map and is referred to herein as an "unfilled projection image." The environment map generation engine applies a hole filling model to the unfilled projection image to generate a projection image with the hole area filled with created image content, referred to herein as a "filled projection image."

The environment map generation engine 114 projects the filled projection image back to the sphere in the 3D space to identify image content for the hole area of the environment map. The identified image content is used to fill the hole area of the environment map. The environment map with the hole area filled with image content is referred to herein as a "filled environment map." The sphere image, the unfilled environment map or the filled environment map described above can be represented using a 2D image through any map projection, such as an equirectangular projection.

As used herein, the term "image" refers to a photo, a picture, a digital painting, a computer-generated graphic, or any other artifact that depicts visual perception. As used herein, "rendering an image" refers to the process of generating an output image based on one or more commands. For example, rendering an image based on a command to compose a 2D image and a 3D object includes generating an image representing a view of a scene where the 3D object is placed inside the environment depicted by the 2D image. The rendering may further include generating layers of the image if the image is represented by multiple layers, or generating titles of the image if the image containing multiple titles, or some combination thereof. The rendering may further includes compositing the multiple layers or tiles of the image into a single output image for display. The performance of the rendering process is referred to herein as "image rendition" or "rendition." The output image generated by the rendering process is referred to herein as the "rendered image."

Example Operating Environment for Environment Map Generation and Hole Filling

Referring now to the drawings, FIG. 1 depicts an example of a computing environment 100 for using an image manipulation application 102 to perform image manipulation based on a user input 112. The computing environment 100 includes one or more processing devices that execute an image manipulation application 102, an input device 104 for providing commands to the image manipulation application 102, and a display device 132 for displaying a user interface for receiving commands from the input device 104 and for displaying a rendered image 118 generated by the image manipulation application 102 based on the commands.

The image manipulation application 102 includes an image rendering engine 116 for generating rendered images based on the user input 112 and for providing the rendered image 118 to the display device 132 for display. The image manipulation application 102 further includes an environment map generation engine 114 for generating an environment map 110 based on an input background image 106. As discussed above, generating the environment map 110 might involve extrapolating or creating image content that is not observed in the background image 106 to fill the hole area of the environment map 110. The environment map generation engine 114 trains and applies a hole filling model 108 to create the image content for the hole area of the environment map 110. Training of the hole filling model 108 is performed based on a set of panorama images 124. The panorama images 124 can include 360-degree spherical environment images or any image showing a wide-angle view or representation of a physical space. The environment map generation engine 114 utilizes the panorama images 124 to build training samples to train the hole filling model 108. Detailed examples of training the hole filling model 108 to fill a hole area of an environment map 110 are described herein with respect to FIGS. 2 and 9-11.

The environment map 110 created by the environment map generation engine 114 is utilized by the image rendering engine 116 to perform various image manipulations based on the user input 112 and to generate the rendered image 118. For example, the image manipulation application 102 provides functions that allow a user to combine a 2D background image 106 with 3D objects 122 to generate a composed image showing the 3D objects 122 positioned in an environment illustrated in the 2D background image. The background image 106 can be provided by a user in the user input 112, such as via a user selecting the background image 106 from a local storage device or a network storage device. Alternatively, or additionally, the image manipulation application 102 allows the user to select the background image 106 from an image datastore 120 accessible to the image manipulation application 102. Similarly, the user of the image manipulation application 102 can provide the 3D objects 122 to the image manipulation application 102 or select the 3D objects 122 from the image datastore 120 or other object datastore provided by the image manipulation application 102.

To create photorealistic images, the image manipulation application 102 utilizes the environment map generation engine 114 to generate an environment map 110 simulating a spherical environment surrounding the 3D objects 122 based on the background image 106. The image rendering engine 116 generates the rendered image 118 by simulating a camera capturing an image of the 3D objects 122 placed in the spherical environment depicted by the environment map 110. The image rendering engine 116 can also accept user input 112 during the rendering process, for example, to adjust parameters such as the capturing angle, the field of view of the simulated camera, the brightness, color, contrast of the image and so on. The rendered image 118 is then sent to the display device 132 for display.

Figure 2:
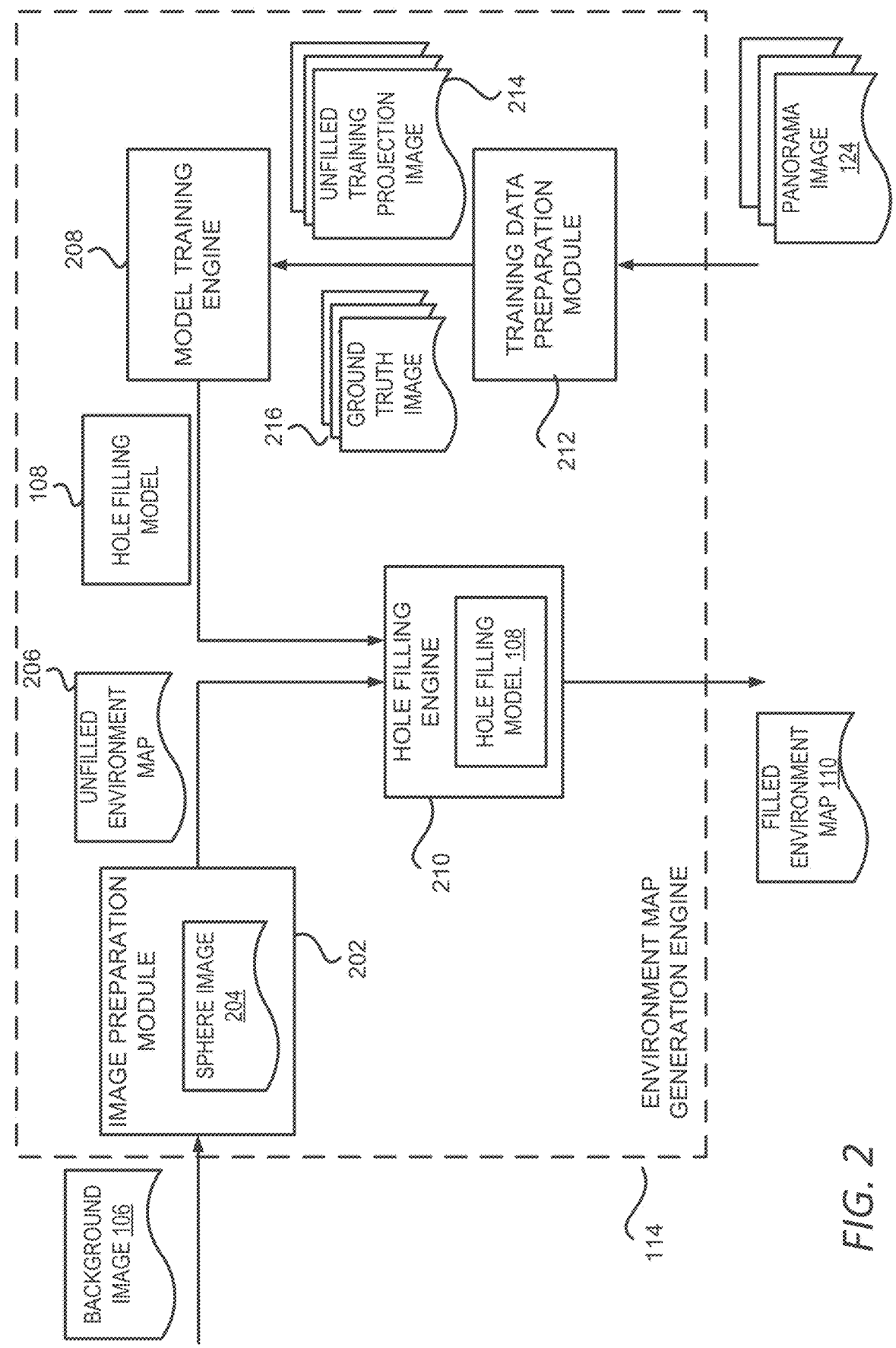
FIG. 2 depicts an example of a block diagram illustrating aspects of an environment map generation engine, according to certain embodiments of the present disclosure.

FIG. 2 depicts an example of a block diagram illustrating aspects of an environment map generation engine 114, according to certain embodiments of the present disclosure. In the example shown in FIG. 2, the environment map generation engine 114 includes an image preparation module 202 configured to generate an unfilled environment map 206, a model training engine 208 configured to build and train a hole filling model 108, and a hole filling engine 210 configured to fill the hole area of the unfilled environment map 206 utilizing the hole filling model 108 to generate a complete environment map 110, also referred to as a filled environment map 110.

The image preparation module 202 accepts a background image 106 as an input and converts the background image 106 into a sphere image 204. The conversion can be performed by projecting the background image 106 onto a sphere in a 3D space. For example, the image preparation module 202 can apply inverse gnomonic projection on the background image 106 with an assumed field of view. Because of the limited field of view associated with the background image 106, the sphere image 204 covers a portion of the surface of the sphere.

To generate an environment map 110, the image preparation module 202 scales the sphere image 204 to cover a 180-degree horizontal field of view. In some embodiments, the image preparation module 202 performs the scaling by resizing the sphere image 204 to an aspect ratio of 2×1 and expanding the sphere image 204 to cover the 180-degree field of view. Accordingly, the scaled sphere image 204 covers a hemisphere. To provide a realistic looking environment map, the scaling can be performed using content aware scaling techniques, such as the seam carving technique. The content aware scaling technique analyzes the content of the image and applies scaling on regions of the image that do not significantly affect the visual quality of the image while leaving the rest unchanged.

To cover the entire sphere, the image preparation module 202 flips the scaled sphere image 204 horizontally and concatenates the flipped image with the scaled sphere image 204 to form an image with a 360-degree horizontal field of view, i.e. an unfilled environment map 206. The unfilled environment map 206 thus has a field of view larger than that of the sphere image 204. However, even though the unfilled environment map 206 covers the 360-degree horizontal field of view, it does not have enough content to cover the entire sphere, especially at the north pole area, i.e. the top area of the sphere, and the south pole area, i.e. bottom area of the sphere. Those areas in the unfilled environment map 206 form the hole area of the environment map and need to be filled in order to generate a complete environment map 110.

For a background image 106 depicting an indoor scene, the north pole area of the unfilled environment map 206 corresponds to the ceiling of the spherical environment and the south pole area corresponds to the floor of the spherical environment. Due to the nature of the indoor environment, generally there is no significant difference in the ceiling area and the floor area in terms of the brightness and color of the areas. Similarly, there is also no significant difference between the north pole and the south pole areas of an environment map generated based on a background image depicting a nighttime outdoor scene. For a background image depicting a daytime outdoor scene, however, the north pole area, corresponding to the sky, is generally much brighter and has different color than the south pole area, corresponding to the ground. Filling the north pole area of the unfilled environment map 206 is more challenging especially for background images that do not contain much content for the sky.

Therefore, the following description will focus on hole filling the north pole area of the unfilled environment map 206. It should be understood, however, that filling other hole areas of the unfilled environment map 206 or filling the hole areas of other types of unfilled environment maps 206 can be performed similarly. Alternatively, or additionally, the environment map generation engine 114 can utilize a different hole filling mechanism to fill the south pole area of the unfilled environment map 206 or the entire hole area of an environment map for an indoor scene or a nighttime outdoor scene. In those scenarios, the environment map generation engine 114 can employ a classifier to determine whether an input background image 106 depicts an outdoor daytime scene. If so, the environment map generation engine 114 utilizes the hole filling mechanism described herein to fill the north pole area of the unfilled environment map 206; otherwise, the environment map generation engine 114 utilizes another suitable hole filling mechanism to fill the hole area of the unfilled environment map 206.

In order to fill the hole area of the unfilled environment map 206, the environment map generation engine 114 builds a hole filling model 108 utilizing a model training engine 208. According to some implementations, the hole filling model 108 is a machine learning model trained to accept a projection image along with indication of the hole area of the projection image to be filled and to generate image content for the hole area of the projection image. In one example, the hole filling model 108 includes a generative adversarial network ("GAN") implemented by a system of two neural networks, i.e. a generator and a discriminator, contesting with each other in a zero-sum game framework. In this example, the generator is a two-stage dilated residual network and the discriminator is a three-resolution fully-convolutional network. The model training engine 208 trains the GAN model by performing iterative adjustments of parameters of the two neural networks based on a set of training samples to minimize a loss function of the GAN model.

A training sample can include an unfilled training projection image 214 with a hole area to be filled and a ground truth image 216 containing the actual image content for the unfilled training projection image 214. To generate the training samples for the model training engine 208, the environment map generation engine 114 employs a training data preparation module 212, which generates the training samples based on a set of panorama images 124 as discussed with regard to FIG. 1. Detailed examples of generating training samples and training the hole filling model 108 are described herein with respect to FIGS. 9 and 10.

Figure 3:
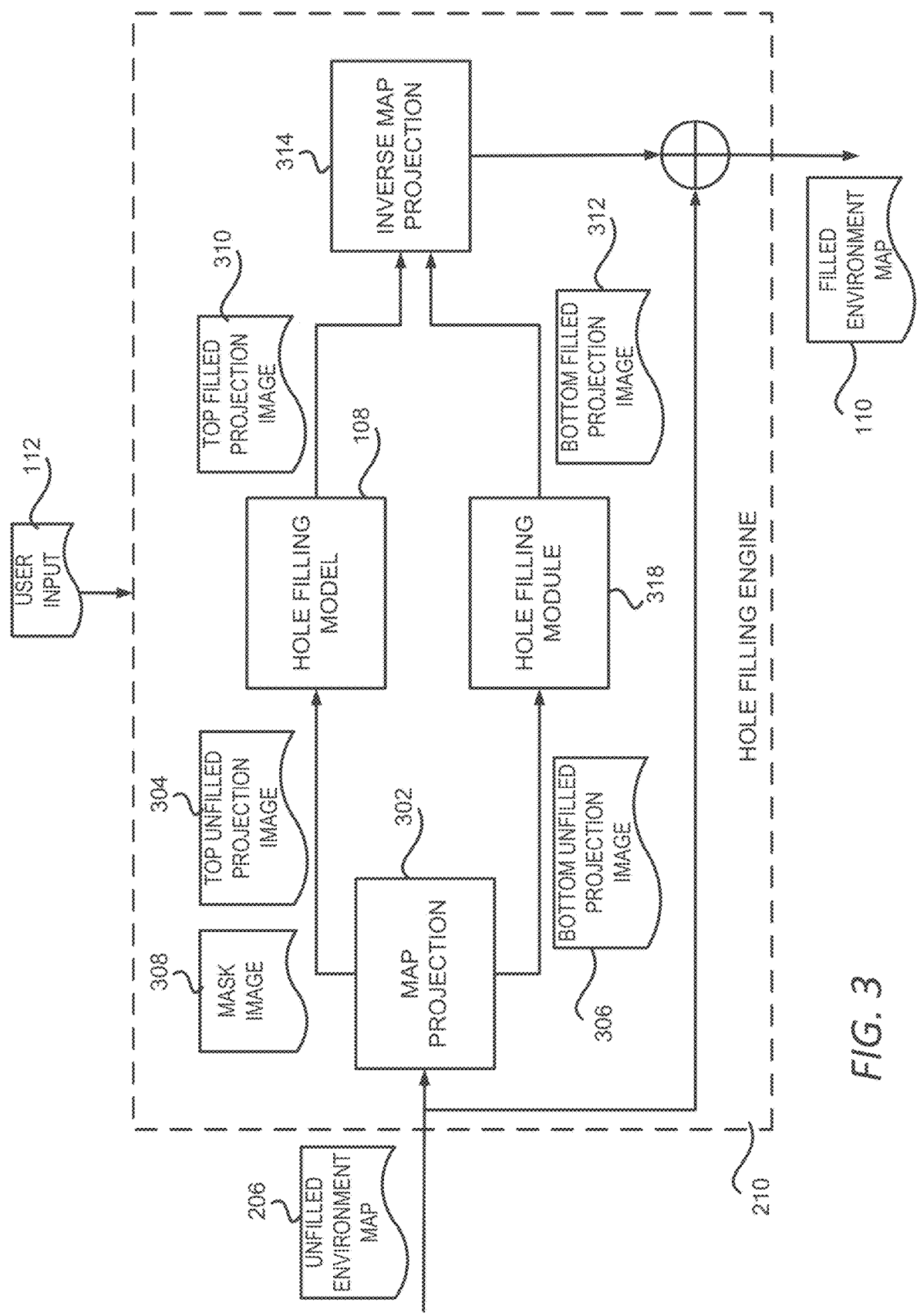
FIG. 3 depicts an example of a block diagram illustrating aspects of a hole filling engine, according to certain embodiments of the present disclosure.

Based on the trained hole filling model 108, the environment map generation engine 114 can utilize the hole filling engine 210 to perform the hole filling for the unfilled environment map 206. FIG. 3 depicts an example of a block diagram illustrating aspects of the hole filling engine 210, according to certain embodiments of the present disclosure. In the example shown in FIG. 3, the unfilled environment map 206 undergoes a map projection 302 that projects at least a portion of the unfilled environment map 206 onto a 2D image. The map projection can be implemented using any map projection method. In one example, the hole filling engine 210 utilizes a gnomonic projection which minimizes distortion when projecting back and forth between a sphere and a 2D plane. The gnomonic projection tends to keep straight lines straighter than other forms of projection and thus is beneficial to hole-filling techniques used to fill hole areas in 2D images.

The hole filling engine 210 applies the map projection 302 from the north pole of the unfilled environment map 206 to generate a top unfilled projection image 304. The top unfilled projection image 304 includes a hole area of the unfilled environment map 206 observed from north pole. Similarly, the hole filling engine 210 applies the map projection 302 on the south pole of the unfilled environment map 206 to generate a bottom unfilled projection image 306 containing a hole area of the unfilled environment map 206 observed from the south pole of the sphere.

As discussed above, the hole area of the bottom unfilled projection image 306 corresponding to the ground of a spherical environment and poses less challenge to the hole filling task. As such, any hole filling mechanism, including the hole filling mechanism presented herein, can be utilized in the hole filling module 318 to fill the hole area and to generate a bottom filled projection image 312. The hole area of the top unfilled projection image 304, on the other hand, corresponds to the sky which has a brighter and different color than the rest of the unfilled environment map 206. To fill the hole area of the top unfilled projection image 304, the hole filling engine 210 utilizes a hole filling model 108 according to the disclosures presented herein. The hole filling model 108 is a machine learning model trained to perform hole filling of an area that includes the sky.

The hole filling model 108 can be trained to accept the top unfilled projection image 304, also referred to herein as "unfilled projection image 304," as an input. In addition, the hole filling engine 210 also generates and provides a mask image 308 to the hole filling model 108 indicating the hole area that needs to be filled in the unfilled projection image 304. For example, the hole filling engine 210 can generate a mask image 308 having the same size as the unfilled projection image 304 and use a mask value 0 to represent the hole area and a mask value 1 for the rest of the image. Based on the unfilled projection image 304 and the mask image 308, the hole filling model 108 can create image content and fill the hole area of the unfilled projection image 304 to generate a top filled projection image 310. In some implementations, the user of the image manipulation application 102 can provide user input 112 to the hole filling engine 210 to influence the hole filling process. Detailed examples of hole filling the environment map are described herein with respect to FIGS. 4-8.

Each of the top filled projection image 310 and the bottom filled projection image 312 is projected back to the sphere through an inverse map projection 314 that corresponds to the map projection 302. For example, if a gnomonic projection is used in the map projection 302, an inverse gnomonic projection is to be used in the inverse map projection 314. The inverse map projection maps the filled image content of the hole area in the top filled projection image 310 and the bottom filled projection image 310 to the corresponding hole area of the unfilled environment map 206. The image content for the hole area of the unfilled environment map 206 along with the existing content of the unfilled environment map 206 form the filled environment map 110.

Figure 4:
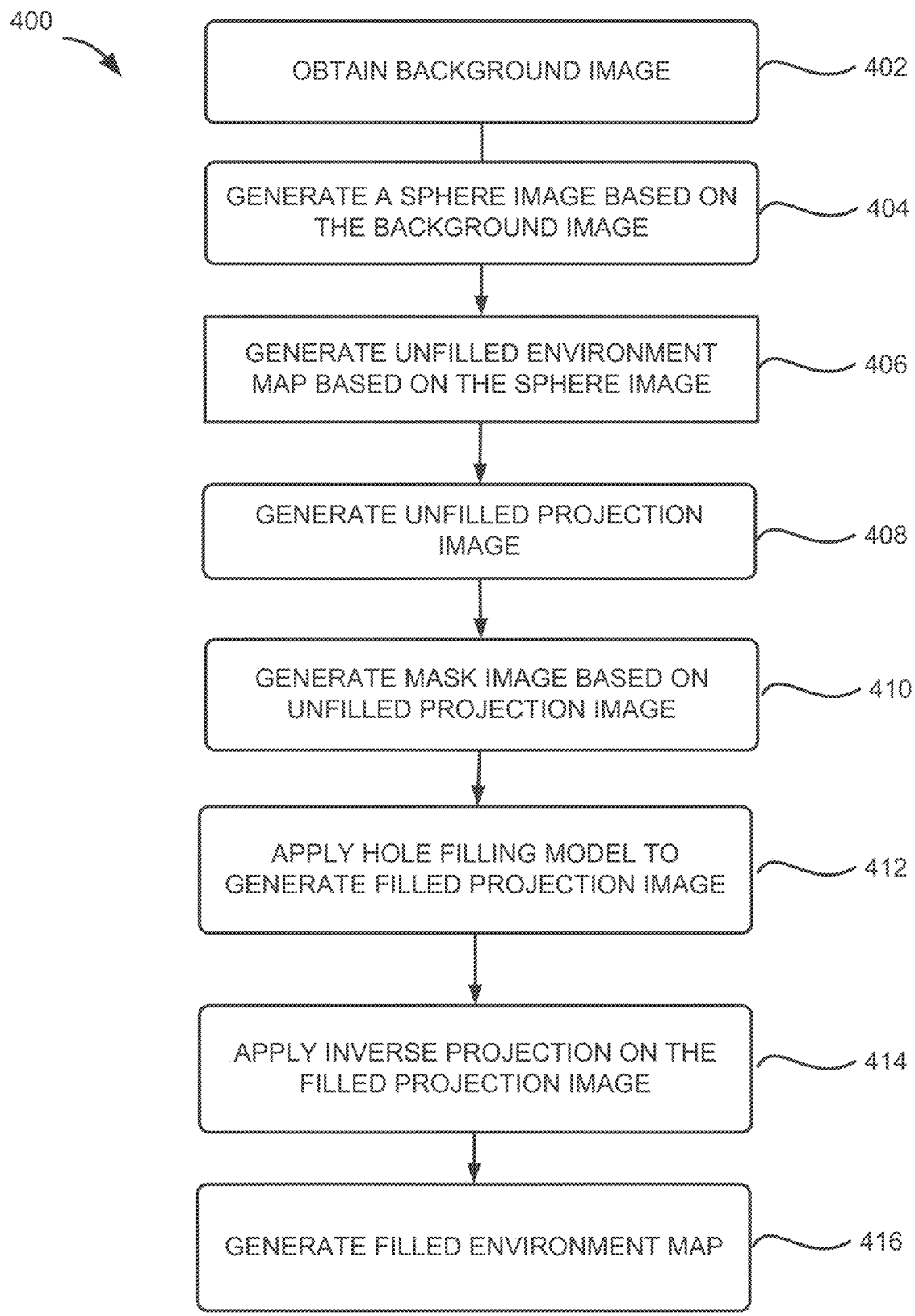
FIG. 4 depicts an example of a process for generating and hole filling an environment map, according to certain embodiments of the present disclosure.

Examples of Computer-Implemented Operations for Environment Map Generation and Hole Filling FIG. 4 depicts an example of a process 400 for generating and hole filling an environment map, according to certain embodiments of the present disclosure. One or more computing devices (e.g., the computing environment 100) implement operations depicted in FIG. 4 by executing suitable program code (e.g., the image manipulation application 102). For illustrative purposes, the process 400 is described with reference to certain examples depicted in the figures. Other implementations, however, are possible.

At block 402, the process 400 involves obtaining a background image 106 based on which an environment map 110 is to be generated. The background image 106 can be a 2D image of an indoor or outdoor scene depicting an environment where one or more 3D objects can be positioned. The background image 106 may be a user provided image or be selected from an image datastore provided by the image manipulation application 102.

Figure 5A:
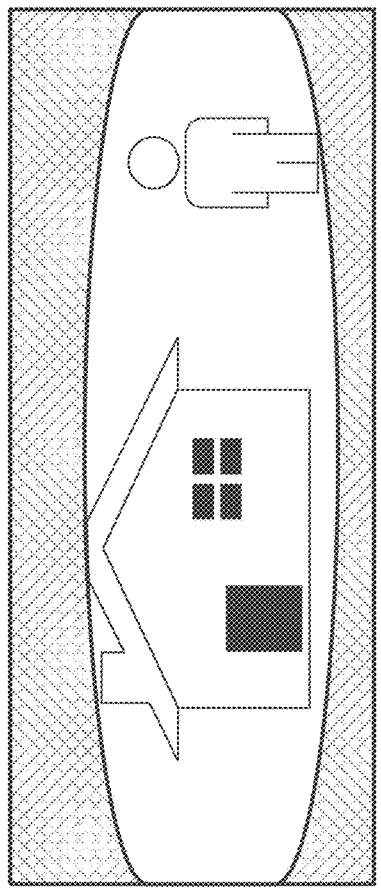
FIGS. 5A-5C depict examples of images generated for an unfilled environment map, according to certain embodiments of the present disclosure.

At block 404, the process 400 involves generating a sphere image 204 by projecting the background image 106 onto a sphere in a 3D space using an assumed field of view. For example, the sphere image 204 can be generated by using an inverse gnomonic projection. Due to the limited field of view of the background image, the sphere image 204 covers only a portion of the sphere. FIG. 5A illustrates an example of a sphere image 204, which is represented using a 2D image generated by applying the equirectangular projection on the sphere image. In the sphere image 204 shown in FIG. 5A, the shaded area represents the portion of the sphere that the sphere image does not cover. For example, the top of the house roof is in the shaded are, which means that the background image does not show the top of the roof. Similarly, most of the sky area is also in the shaded area and was not shown in the input background image.

Figure 5B:
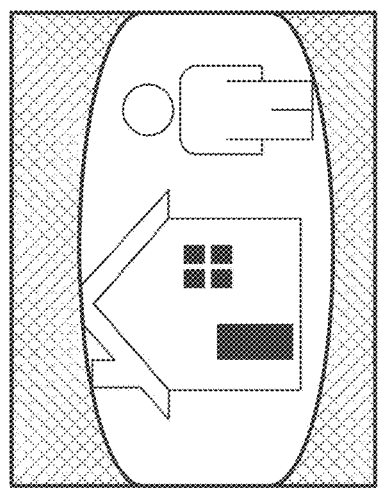

Referring back to FIG. 4, at block 406, the process 400 involves generating an unfilled environment map 206 based on the sphere image 204. The image manipulation application 102 scales the sphere image 204 to cover a 180-degree field of view, for example, by resizing the sphere image 204 according to an aspect ratio of 2×1. The scaling can be performed using content aware scaling so that the generated environment map 110 appears realistic. FIG. 5B illustrates an image generated by scaling the sphere image shown in FIG. 5A. As can be seen from FIG. 5B, the house has been stretched due to the expansion of the field of the view of the image. The person standing near the house, however, does not have any noticeable visual change. Because stretching the person in a similar way as stretching the house would introduce visible distortion to the image leading to an unrealistic environment map, the content aware scaling employed by the image manipulation application 102 determines not to scale the person in order to avoid the visible distortion. As shown in FIG. 5B, the shaded area lacking image content from the background image 106 is also stretched.

Figure 5C:
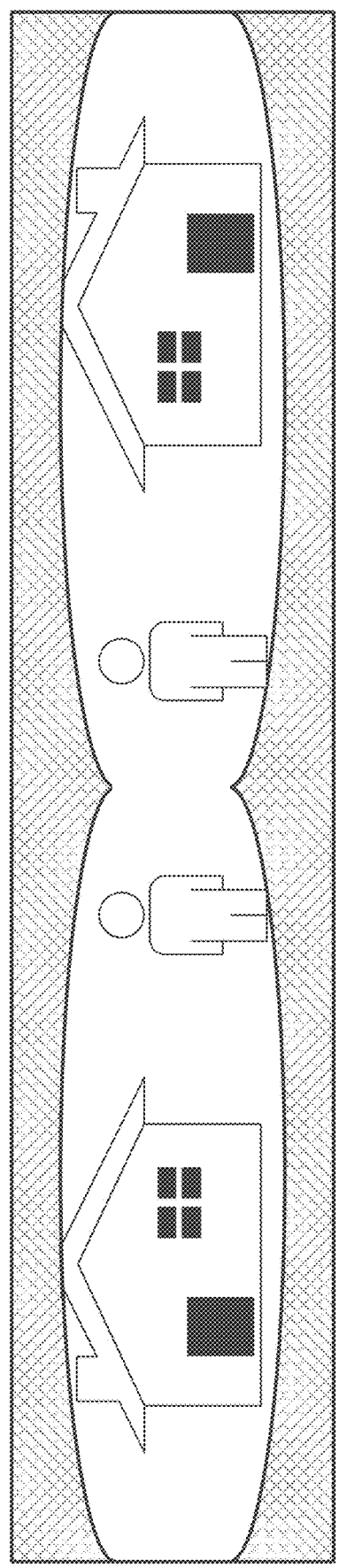

The image manipulation application 102 further generates an image with a 360-degree horizontal field of view by flipping the scaled sphere image 204 horizontally and concatenating the flipped image with the scaled sphere image. This image is output as the unfilled environment map 206. FIG. 5C illustrates an example of the unfilled environment map 206 generated using the stretched image shown in FIG. 5B.

Figure 6A:
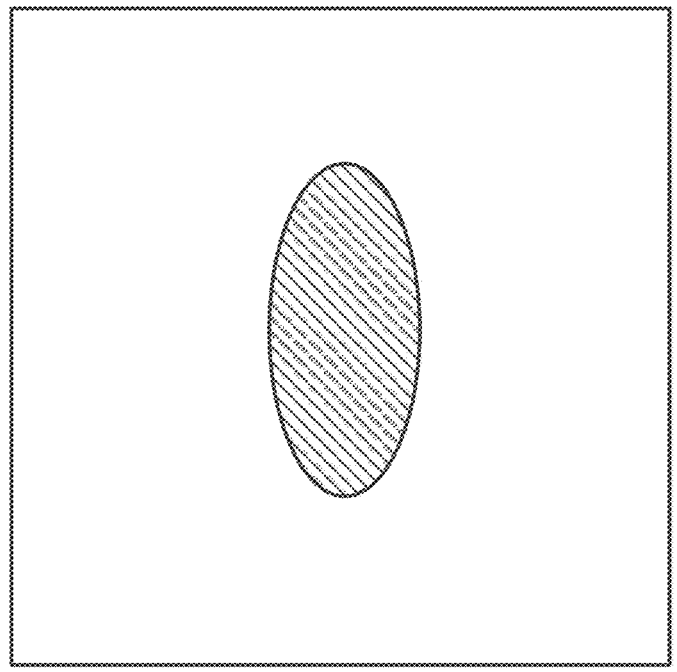
FIGS. 6A-6D depict examples of unfilled projection images and respective mask images, according to certain embodiments of the present disclosure.

Referring back to FIG. 4, at block 408, the process 400 involves generating an unfilled projection image. As discussed above with respect to FIG. 3, an unfilled projection image is generated by projecting a portion of the unfilled environment map 206 onto a 2D image. The projection can be performed using a gnomonic projection. If the hole area to be filled is the sky area of the unfilled environment map 206, the projection can be performed from the north pole of the sphere to capture a top unfilled projection image for the sky area. FIG. 6A illustrates an example of a top unfilled projection image for the unfilled environment map shown in FIG. 5C. As shown in FIG. 6A, the shaded area represents the hole area of the unfilled environment map 206 that needs to be filled with image content.

Figure 6B:
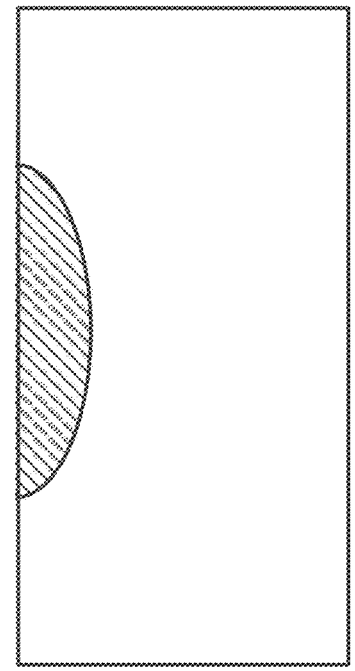
Figure 6C:
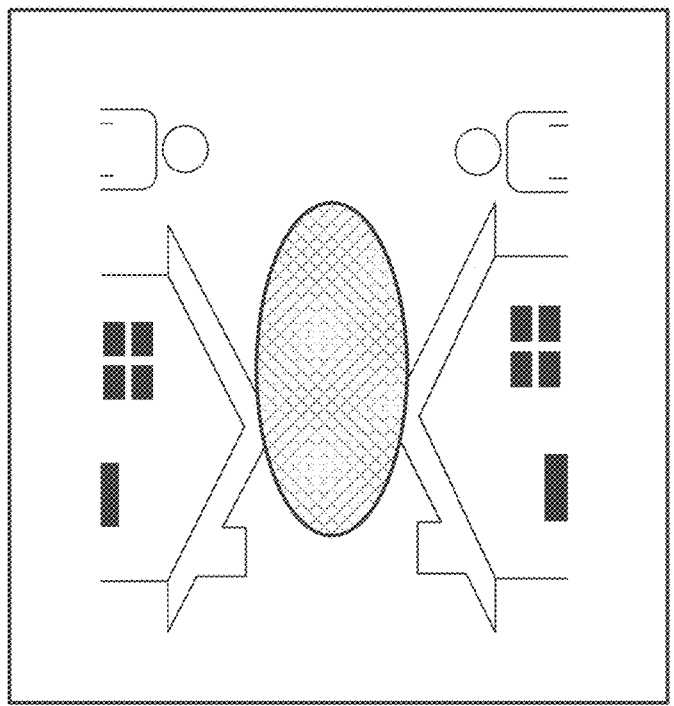
Figure 6D:
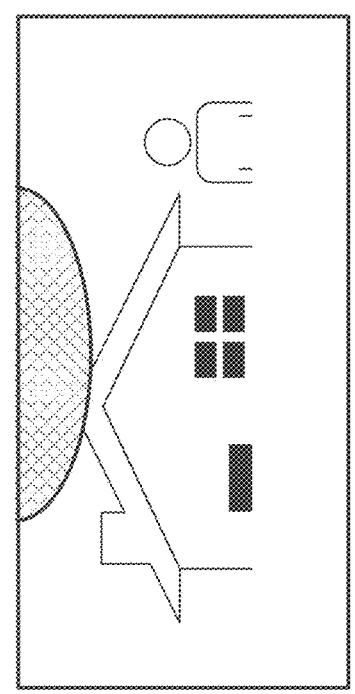

At block 410, the process 400 involves generating a mask image to indicate the hole area to be filled. The mask image can be generated based on the unfilled projection image. For example, the image manipulation application 102 can generate a mask image 308 having the same size as the unfilled projection image and use a mask value 0 to represent the hole area and a mask value 1 for the rest of the image, or vice versa. FIG. 6B shows an example of the mask image generated for the unfilled projection image shown in FIG. 6A. In this example mask image, the shade area indicates the hole area to be filled and corresponds to the shaded area in FIG. 6A, and the rest of the area corresponds to the area of the unfilled projection image that does not need hole filling. Due to the symmetry of the unfilled environment map 206 and thus the unfilled projection image, the filling content for the hole area would also be symmetric. As such, hole filling can be performed using one half of the image as shown in FIG. 6C along with the corresponding half of the mask image, thereby reducing the consumption of the computational resources, such as CPU time and memory space. In the following, the term "unfilled projection image" and "mask image" may referred to the full images as shown in FIGS. 6A and 6B, or the half images shown in FIGS. 6C and 6D depending on the context. In either case, the resulted environment map 110 would be the same.

Figure 7C:
FIGS. 7A-7F depict examples of images generated at various stages of the hole filling process, in accordance with certain embodiments of the present disclosure.
Figure 7F:
Figure 7B:
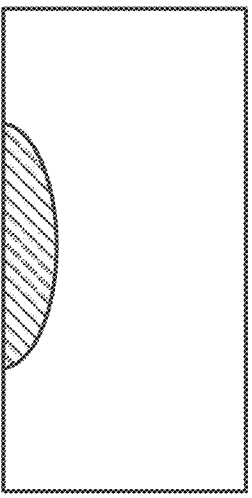
Figure 7E:
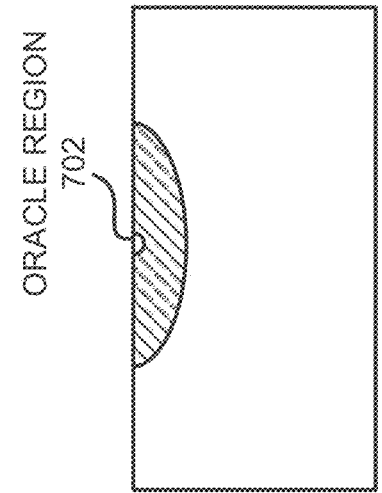
Figure 7A:
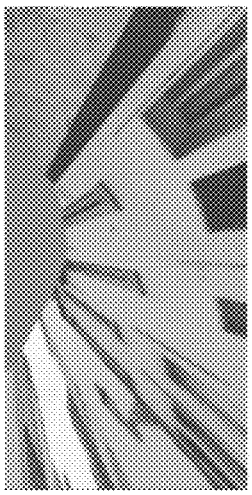

Referring back to FIG. 4, the process 400 involves, at block 412, applying the hole filling model 108 to the unfilled projection image 304 and its associated mask image to generate a filled projection image. Depending on the hole filling result, the image manipulation application 102 may employ the hole filling model 108 for additional rounds or passes to generate the final filled projection image. FIGS. 7A-7F depict examples of images generated at various stages of a multi-pass hole filling process. FIG. 7A shows an unfilled projection image and FIG. 7B shows the associated mask image with the shaded area indicating the hole area to be filled. FIG. 7C shows the filled projection image in the first pass of the hole filling process. It can be seen from FIG. 7C that some of the generated content for the hole area includes content from the building and does not show a realistic appearance for the sky area. To improve the results, the image manipulation application 102 can perform a second pass of hole filling for the unfilled projection image.

In the second pass, the image manipulation application 102 modifies the unfilled projection image by specifying an oracle region 702 within the hole area. The oracle region 702 is filled with the desired content. The content of the oracle region 702 can be derived from the filling results of the first pass. For example, the image manipulation application 102 can select a color from the generated content in the first pass as the color for the oracle region. In one example, the color having a certain percentile brightness, e.g. $95^{th}$ percentile, can be selected. In other words, if the pixels of the generated content are ordered from the darkest to the brightest with the brightest being 100%, the color of the pixel that is listed at the 95% brightness will be selected for the oracle region 702. Alternatively, or additionally, the image manipulation application 102 can selected the color for the oracle region 702 based on a color specified in the user input 112. The oracle region 702 can provide a hint to the hole filling model 108 when filling the hole area of the unfilled projection image. The size of the oracle region 702 can be determined experimentally based on previous filling results, or specified by a user through the user input 112.

Figure 7D:
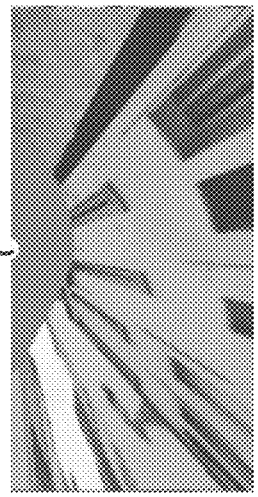

The mask image for the unfilled projection image is also updated to show that the oracle region 702 is part of the known content and does not belong to the hole area. The updated unfilled projection image along with the updated mask image are fed into the hole filling model 108 to generate image content for the hole area again. FIG. 7D shows an example of the updated unfilled projection image for the image shown in FIG. 7A, and FIG. 7E shows its corresponding mask image. FIG. 7F shows the results for the updated projection image in the second pass of the hole filling process. Compared with the filling results shown in FIG. 7C, the filled content in FIG. 7F is closer to the true color of a sky and appears more natural than the results from the first pass. Additional passes can be performed if needed. Furthermore, if a user of the image manipulation application 102 decides to influence the hole filling process by specifying the oracle region and providing the color for the oracle region, the first pass of the filling process described above can be skipped. As such, only the second pass need to be performed to generate the content for the hole area.

Referring back to FIG. 4, at block 414, the process 400 involves applying inverse projection on the filled projection image. The inverse projection corresponds to the projection operation applied in block 408 and project the filled projection image back to the sphere. For example, if the projection in block 408 is performed using a gnomonic projection, the inverse projection in block 414 is performed using an inverse gnomonic projection. The inverse map projection maps the filled image content of the hole area in the filled projection image to the hole area of the unfilled environment map thereby filling the hole area of the unfilled environment map 206. At block 416, the process involves generating a filled environment map 110 by filling the hole area of the unfilled environment map with the content generated at block 414. FIGS. 8A-8D show examples of real images generated in an environment map generation and hole filling process. FIG. 8A shows a sphere image generated from a background image depicting an outdoor scene. FIG. 8B shows a scaled sphere image and FIG. 8C shows the unfilled environment map. FIG. 8D is the filled environment map with the sky area filled using the hole filling mechanism described herein. Again, the images shown in FIGS. 8A-8D are equirectangular projected images of the sphere image, stretched sphere image, unfilled environment map and filled environment map, respectively.

Figure 9:
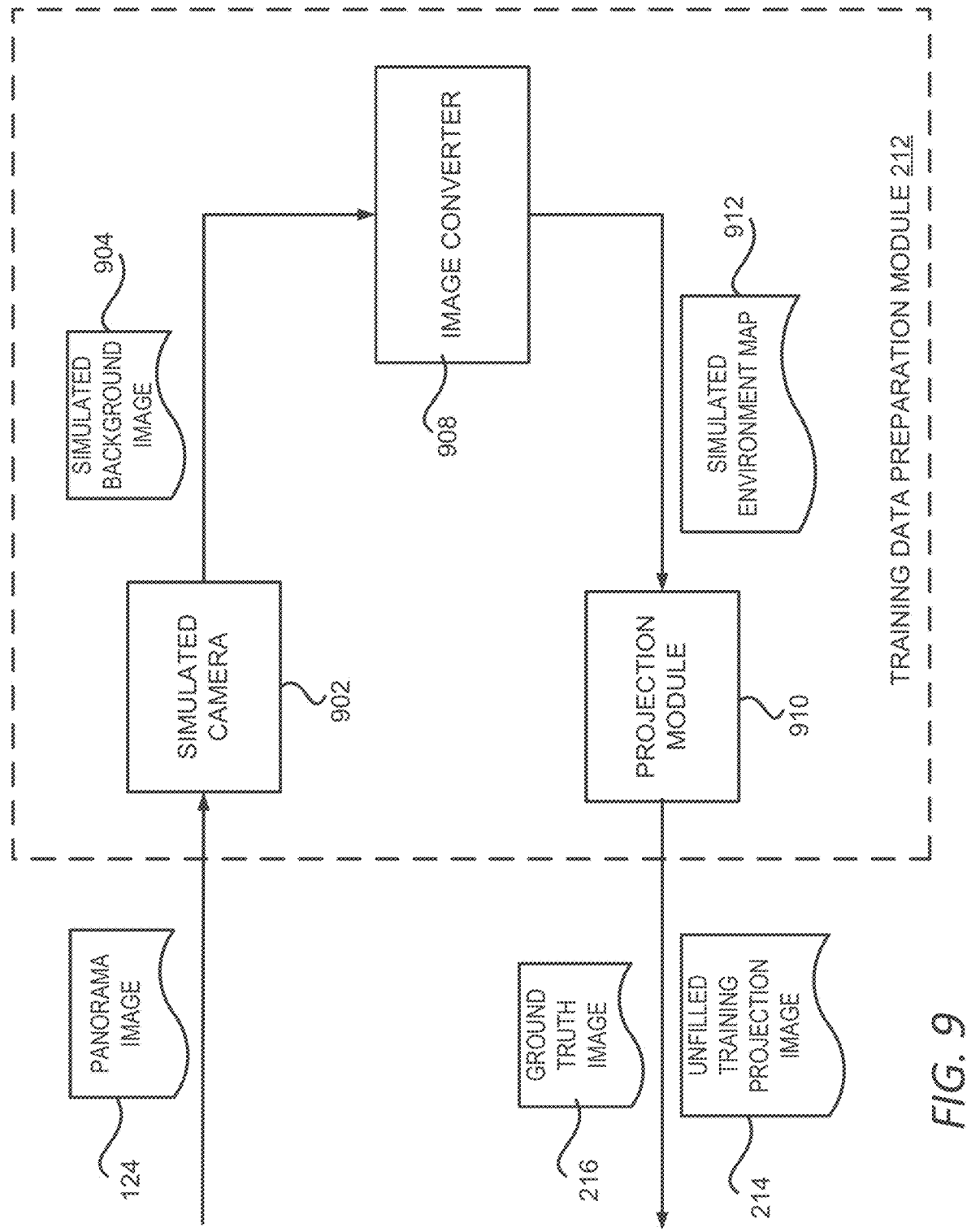
FIG. 9 depicts an example of a block diagram illustrating aspects of a training data preparation module, according to certain embodiments of the present disclosure.

FIG. 9 depicts an example of a block diagram illustrating aspects of a training data preparation module 212 described with respect to FIG. 2. The training data preparation module 212 shown in FIG. 9 includes a simulated camera 902, an image converter 908 and a projection module 910. The training data preparation module 212 accepts a panorama image 124 as an input and generates an unfilled training projection image 214 and the corresponding ground truth image 216 for the model training engine 208 to use as a training sample.

The training data preparation module 212 utilizes the simulated camera 902 to generate a simulated background image 904 based on the input panorama image 124. The simulated camera 902 can select camera parameters such as the camera angle, aspect ratio, and/or horizontal field of view within the panorama image 124. These parameters can be selected randomly or pseudo-randomly within a reasonable range for each parameter. The simulated camera 902 then generates the simulated background image 904 by projecting, through gnomonic projection for example, the panorama image 124 into a two-dimensional image plane using the selected parameters. The simulated background image 904 shows a 2D representation of the panorama image 124 viewed through a camera with the selected parameters. In one example, the simulated camera 902 does not restrict the vertical field of view, and thus the simulated background image 904 contains all the content from the panorama image 124 with the selected horizontal field of view. In other words, the vertical field of view of the simulated camera 902 can be as large as −90 degree to 90 degree.

The training data preparation module 212 utilizes an image converter 908 to convert the simulated background image 904 to a simulated environment map 912. According to some implementations, the image converter 908 converts the simulated background image 904 in a similar way as the image preparation module 202 converting the background image 106. That is, the image converter 908 generates a sphere image for the simulated background image 904 by projecting the simulated background image 904 on to a sphere in the 3D space. The sphere image then undergoes the same scaling and flipping process described above for generating the unfilled environment map 206. Here, the scaling and filliping process generates a simulated environment map 912. Because the simulated background image 904 has a full vertical field of view, the simulated environment map 912 does not have a hole area.

The training data preparation module 212 then creates an unfilled training environment map by segmenting the simulated environment map 912 into an observed area, i.e. the area having image content, and a hole area, i.e. the area to be filled with image content. The segmentation can be based on a selected aspect ratio of the simulated background image 904. Segmenting the simulated environment map 912 in this way allows the training data preparation module 212 to generate an unfilled training environment map by including only the content from the observed area. The projection module 910 then employs the same projection used in the map projection 302 of FIG. 3 to project the unfilled training environment map to an unfilled training projection image 214 and to project the simulated environment map 912 to an ground truth image 216. A mask image can also be generated for the unfilled training projection image 214 to indicate the hole area. The unfilled training projection image 214 and the ground truth image 216, as well as the mask image if needed, will be used as one training sample for the model training engine 208. The above process can be repeated to generate more training samples.

According to some implementations, the training data preparation module 212 also prepare training samples with oracle regions. As discussed above with regard to FIGS. 7D and 7E, an oracle region 702 can be added to an unfilled projection image 304 to provide a color hint for the hole filling model 108 to fill the hole area of the unfilled projection image 304. In order for the hole filling model 108 to recognize and utilize the oracle region 702, the training data preparation module 212 can also prepare training samples that contain unfilled projection images 304 with oracle regions. For example, when segmenting the simulated environment map 912, the training data preparation module 212 can include an oracle region in the observed area and exclude it from the hole area. The unfilled training projection image 214 and the ground truth image 216 can be generated in the same way as described above. In one example, the training data preparation module 212 can prepare the training samples with half of them containing an oracle region.

Figure 10:
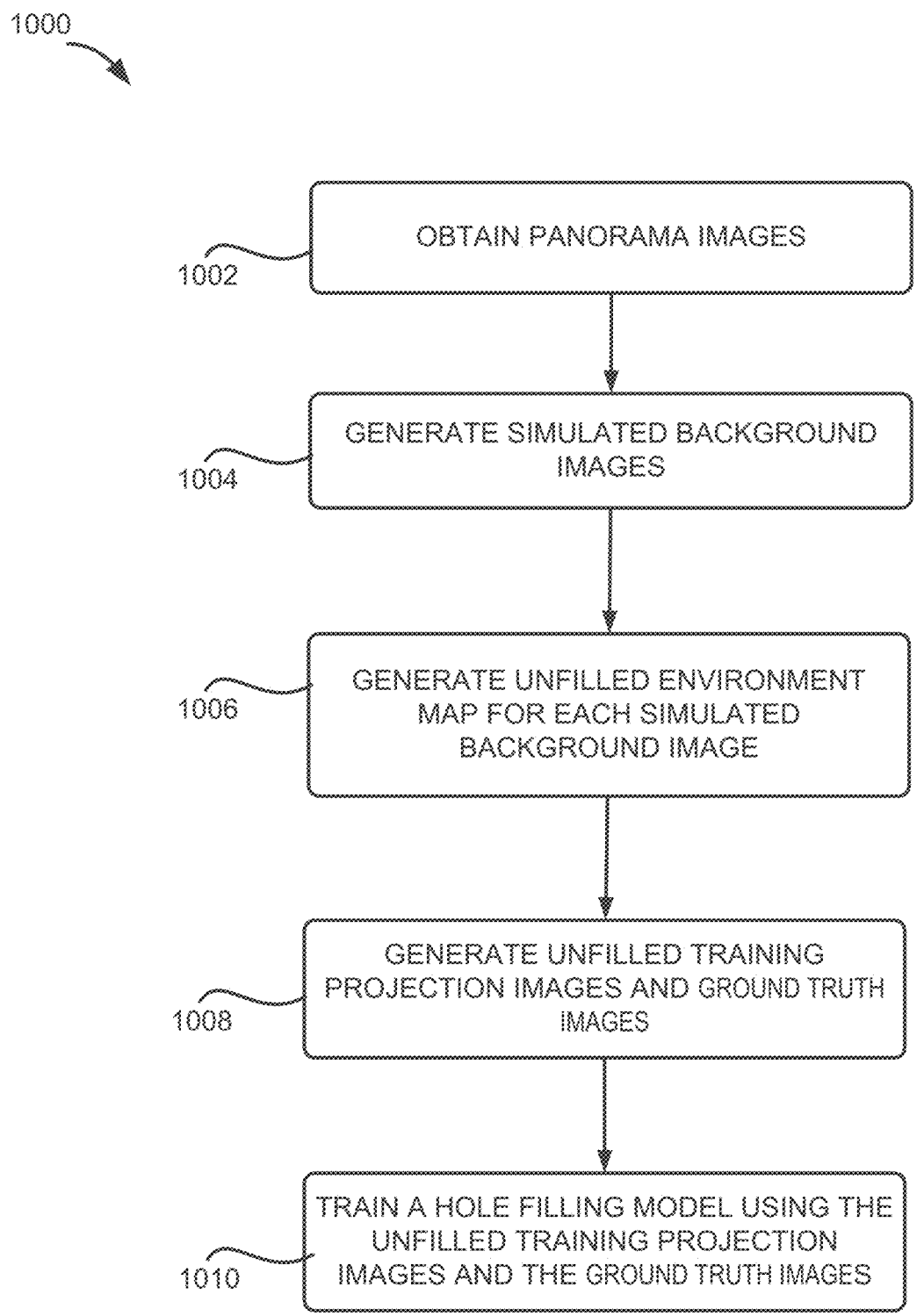
FIG. 10 depicts an example of a process for training a hole filling model, according to certain embodiments of the present disclosure.

FIG. 10 depicts an example of a process for training a hole filling model 108. One or more computing devices (e.g., the computing environment 100) implement operations depicted in FIG. 10 by executing suitable program code (e.g., the image manipulation application 102). For illustrative purposes, the process 1000 is described with reference to certain examples depicted in the figures. Other implementations, however, are possible.

At block 1002, the process 1000 involves obtaining a set of panorama images 124. The panorama images 124 can include 360-degree spherical environment images or any image showing a wide-angle view or representation of a physical space. At block 1004, the process 1000 involves generating simulated background images based on the panorama images 124. As described in detail with respect to FIG. 9, a simulated background image can be generated by projecting, with randomly selected parameters such as horizontal field of view and camera angle, a panorama image 124 into a two-dimensional image plane. In some examples, multiple simulated background images can be generated from one panorama image 124 with different parameters, such as the field of view and camera angle.

At block 1006, the process 1000 involves generating an unfilled environment map for each of the simulated background images. Specifically, a training data preparation module 212 projects a simulated background image onto a sphere to generate a sphere image. The sphere image is then scaled and flipped to cover a 360-degree horizontal field of view resulting in a simulated environment map 912. The training data preparation module 212 segments the simulated environment map into an observed area and a hole area. For some of the simulated environment maps, the observed area includes an oracle region located inside the hole area to provide color hint for the image content to be generated for the hole area. The training data preparation module 212 generates an unfilled environment map by including only the content in the observed area of the simulated environment map.

At block 1008, the process 1000 involves generating training projection images and ground truth images as the training samples for the hole filling model 108. The training data preparation module 212 generates the unfilled training projection images by projecting the unfilled environment maps generated at block 1006 onto a 2D image plane, such as through a gnomonic projection. If the hole filling model 108 is trained to fill in hole area containing the sky of an outdoor scene, the projection will be performed from the north pole of the unfilled environment maps. The training data preparation module 212 generates the ground truth images 216 by projecting the simulated environment map 912 in the same way as their respective unfilled training projection images. If the hole filling model 108 is trained to accept a mask image as an input, the training data preparation module 212 can also generate mask images for the training projection images.

At block 1010, the process 1000 involves training the hole filling model 108 using the unfilled training projection images and the corresponding ground truth images. As discussed above, the hole filling model 108 can be a generative adversarial network including a generator and a discriminator. The generator is a two-stage dilated residual network and the discriminator is a three-resolution fully-convolutional network. The model training engine 208 performs iterative adjustments of parameters of the two neural networks based on the training samples to minimize a loss function of the neural network model. The trained hole filling model 108 can be utilized by the hole filling engine 210 to generate image content for a hole area of an input environment map as described above with respect to FIGS. 2-4.

Figure 11:
FIG. 11 depicts examples of composed images utilizing the environment map generation and hole filling in accordance with certain embodiments of the present disclosure.

FIG. 11 depicts a composed image utilizing the environment map generation and hole filling described herein (left) and a composed image utilizing the environment map and hole filling of a prior art (right). In the example shown in FIG. 11, a food container and a metal ball are composited into a background image depicting an outdoor scene. The left image shows plausible sky pixels on the metal ball because of the reasonable color distribution at the top of the spherical environment map generated using the mechanism described herein, whereas the right image generated use a prior art method shows unrealistic pixels in the reflected area on the metal ball.

It should be appreciated that while the above description focuses on filling a hole area corresponding to the sky of an outdoor scene, the hole filling mechanism can be utilized to fill any type of hole area in an environment map, as along as the hole filling model is properly trained. For example, a hole area of an environment map that corresponds to the ground portion of the scene can be filled by utilizing a hole filling model trained using training samples containing a ground area. In that case, the projection used to generate the projection image will need to be generated from the south pole of the sphere. Other adjustments might need to be made in the training and prediction process.

Figure 12:
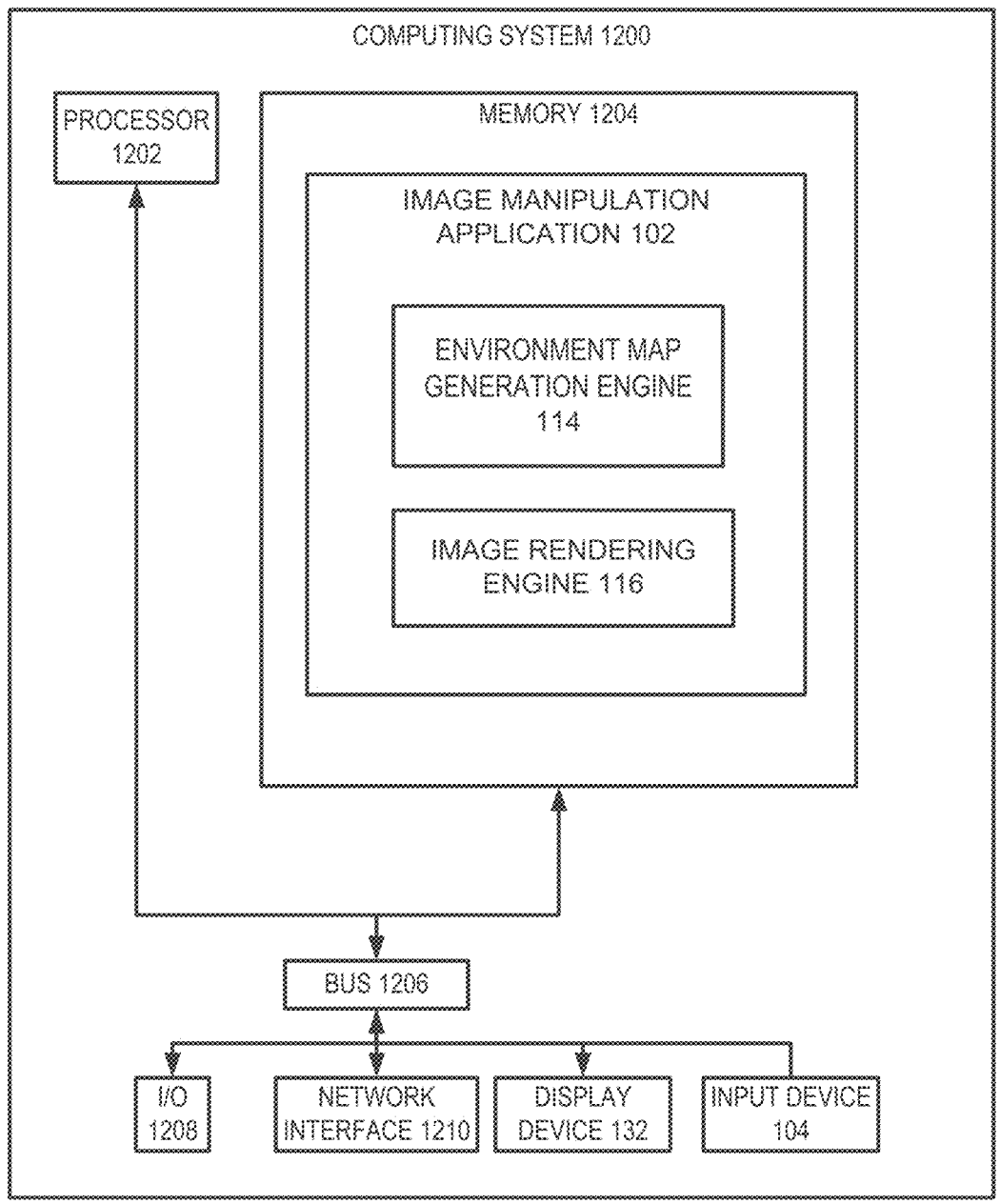
FIG. 12 depicts an example of a computing system that executes an image manipulation application for performing certain embodiments of the present disclosure.

Computing System Example for Implementing Environment Map Generation and Hole Filling Any suitable computing system or group of computing systems can be used for performing the operations described herein. For example, FIG. 12 depicts an example of a computing system 1200 that can implement the computing environment of FIG. 1. In some embodiments, the computing system 1200 includes a processing device 1202 that executes the image manipulation application 102, a memory that stores various data computed or used by the image manipulation application 102, an input device 104 (e.g., a mouse, a stylus, a touchpad, a touchscreen, etc.), and a display device 132 that displays graphical content generated by the image manipulation application 102. For illustrative purposes, FIG. 12 depicts a single computing system on which the image manipulation application 102 is executed, background images and 3D objects are stored, and the input device 104 and display device 132 are present. But these applications, datasets, and devices can be stored or included across different computing systems having devices similar to the devices depicted in FIG. 12.

The depicted example of a computing system 1200 includes a processing device 1202 communicatively coupled to one or more memory devices 1204. The processing device 1202 executes computer-executable program code stored in a memory device 1204, accesses information stored in the memory device 1204, or both. Examples of the processing device 1202 include a microprocessor, an application-specific integrated circuit ("ASIC"), a field-programmable gate array ("FPGA"), or any other suitable processing device. The processing device 1202 can include any number of processing devices, including a single processing device.

The memory device 1204 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 1200 may also include a number of external or internal devices, such as an input device 104, a display device 132, or other input or output devices. For example, the computing system 1200 is shown with one or more input/output ("I/O") interfaces 1208. An I/O interface 1208 can receive input from input devices or provide output to output devices. One or more buses 1206 are also included in the computing system 1200. The buses 1206 communicatively couples one or more components of a respective one of the computing system 1200.

The computing system 1200 executes program code that configures the processing device 1202 to perform one or more of the operations described herein. The program code includes, for example, the image manipulation application 102 or other suitable applications that perform one or more operations described herein. The program code may be resident in the memory device 1204 or any suitable computer-readable medium and may be executed by the processing device 1202 or any other suitable processor. In some embodiments, all modules in the image manipulation application 102 (e.g., the environment map generation engine 114, the image rendering engine 116, etc.) are stored in the memory device 1204, as depicted in FIG. 12. In additional or alternative embodiments, one or more of these modules from the image manipulation application 102 are stored in different memory devices of different computing systems.

In some embodiments, the computing system 1200 also includes a network interface device 1210. The network interface device 1210 includes any device or group of devices suitable for establishing a wired or wireless data connection to one or more data networks. Non-limiting examples of the network interface device 1210 include an Ethernet network adapter, a modem, and/or the like. The computing system 1200 is able to communicate with one or more other computing devices (e.g., a computing device that receives inputs for image manipulation application 102 or displays outputs of the image manipulation application 102) via a data network using the network interface device 1210.

An input device 104 can include any device or group of devices suitable for receiving visual, auditory, or other suitable input that controls or affects the operations of the processing device 1202. Non-limiting examples of the input device 104 include a touchscreen, stylus, a mouse, a keyboard, a microphone, a separate mobile computing device, etc. A display device 132 can include any device or group of devices suitable for providing visual, auditory, or other suitable sensory output. Non-limiting examples of the display device 132 include a touchscreen, a monitor, a separate mobile computing device, etc.

Although FIG. 12 depicts the input device 104 and the display device 132 as being local to the computing device that executes the image manipulation application 102, other implementations are possible. For instance, in some embodiments, one or more of the input device 104 and the display device 132 can include a remote client-computing device that communicates with the computing system 1200 via the network interface device 1210 using one or more data networks described herein.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A computer-implemented method in which one or more processing devices perform operations comprising:
    generating an unfilled environment map based on a background image, the unfilled environment map containing a hole area lacking image content, wherein generating the unfilled environment map comprises:
        projecting the background image onto a sphere to generate a sphere image, scaling the sphere image to cover a horizontal field of view of 180 degrees, flipping the scaled sphere image horizontally, and concatenating the scaled sphere image and the flipped scaled sphere image horizontally to generate the unfilled environment map;
    projecting a portion of the unfilled environment map to an unfilled projection image, the unfilled projection image containing at least a portion of the hole area;
    generating a filled projection image based on the unfilled projection image, the filled projection image containing image content for the portion of the hole area;
    projecting, using an inverse projection, the filled projection image to generate image content for the hole area of the unfilled environment map; and
    generating a filled environment map by combining the unfilled environment map with the generated image content for the hole area of the unfilled environment map.

2. The computer-implemented method of claim 1, wherein the filled environment map represents a field of view of 360 degrees.

3. The computer-implemented method of claim 1, the operations further comprising generating a mask image based on the unfilled projection image, the mask image indicating the hole area as an area to be filled, wherein generating the filled projection image comprises applying a hole filling model to the unfilled projection image and the mask image.

4. The computer-implemented method of claim 3, wherein generating the filled projection image comprises:

applying the hole filling model to the unfilled projection image and the mask image to generate a first filled projection image;

generating a modified unfilled projection image by adding an oracle region containing image content within the hole area of the unfilled projection image;

generating a modified mask image based on the modified unfilled projection image; and applying the hole filling model to the modified unfilled projection image and the modified mask image to generate a second filled projection image as the filled projection image.

5. The computer-implemented method of claim 4, wherein the image content of the oracle region is determined based on the image content of the first filled projection image.

6. The computer-implemented method of claim 4, wherein the image content of the oracle region is determined independent of the image content of the first filled projection image.

7. The computer-implemented method of claim 1, wherein projecting a portion of the unfilled environment map to an unfilled projection image is performed using a map projection, and wherein the map projection is a gnomonic projection.

8. The computer-implemented method of claim 1, wherein the unfilled projection image is generated by projecting the unfilled environment map from a north pole of a sphere represented by the unfilled environment map.

9. The computer-implemented method of claim 1, wherein the unfilled environment map and the filled environment map are represented using respective equirectangular projection images.

10. The computer-implemented method of claim 1, wherein generating the filled projection image comprises applying a hole filling model to the unfilled projection image, and wherein the hole filling model is a generative adversarial network (GAN).

11. A system comprising:
a processing device; and
a non-transitory computer-readable medium communicatively coupled to the processing device, wherein the processing device is configured to execute program code stored in the non-transitory computer-readable medium and thereby perform operations comprising:
generating a plurality of simulated background images from one or more panorama images;
generating a plurality of training samples based on the plurality of simulated background images, the plurality of training samples comprising a plurality of unfilled training projection images each containing a hole area lacking image content and a plurality of ground truth images each containing entire image content for a corresponding unfilled training projection image;
training a hole filling model based on the plurality of training samples;
generating an unfilled environment map based on a background image, the unfilled environment map containing a hole area lacking image content;
projecting a portion of the unfilled environment map to an unfilled projection image, the unfilled projection image containing at least a portion of the hole area;
generating a filled projection image based on the unfilled projection image by applying the hole filling mode to the unfilled projection image, the filled projection image containing image content for the portion of the hole area;
projecting, using an inverse projection, the filled projection image to generate image content for the hole area of the unfilled environment map; and
generating a filled environment map by combining the unfilled environment map with the generated image content for the hole area of the unfilled environment map.

12. The system of claim 11, wherein generating one of the plurality of simulated background images comprises:
selecting, randomly or pseudo-randomly, at least one of a camera angle, a horizontal field of view or an aspect ratio; and
projecting one of the panorama images into a two-dimensional image plane using the horizontal field of view, the camera angle or the aspect ratio to generate the simulated background images.

13. The system of claim 11, wherein at least one of the unfilled training projection images comprises an oracle region located within the hole area and wherein image content of the oracle region is obtained from a corresponding ground truth image.

14. A non-transitory computer-readable medium having program code that is stored thereon, the program code executable by one or more processing devices for performing operations comprising:
generating a plurality of simulated background images from one or more panorama images, wherein generating a simulated background image comprising projecting, with a selected horizontal field of view, one of the panorama images onto a two-dimensional image plane;
generating a plurality of unfilled training projection images based on the plurality of simulated background images, each of the plurality of unfilled training projection images containing a hole area lacking image content and generated by projecting a corresponding simulated background image onto a sphere to generate a sphere image, generating an unfilled environment map based on the sphere image, and projecting, using a map projection, a portion of the unfilled environment map to an unfilled training projection image, the unfilled training projection image containing at least a portion of the hole area;
generating a plurality of ground truth images based on the plurality of simulated background images, the plurality of ground truth images each containing image content for the hole area of a corresponding unfilled training projection image; and
training a hole filling model based on the plurality of unfilled training projection images and the plurality of ground truth images.

15. The non-transitory computer-readable medium of claim 14, wherein generating a simulated background image further comprises selecting, randomly or pseudo-randomly, at least one of a camera angle, a horizontal field of view or an aspect ratio, and wherein projecting one of the panorama images onto the two-dimensional image plane is performed using the horizontal field of view, the camera angle or the aspect ratio.

16. The non-transitory computer-readable medium of claim 14, wherein the unfilled environment map having a horizontal field of view that is larger than a horizontal field of view of the sphere image and containing a hole area lacking image content.

17. The non-transitory computer-readable medium of claim 14, wherein the operations further comprising generating a mask image for each unfilled training projection image based on the unfilled training projection image, the mask image indicating the hole area as an area to be filled, wherein the hole filling model is trained based on the unfilled training projection images in conjunction with the mask images.

18. The non-transitory computer-readable medium of claim 14, wherein the hole filling model is a generative adversarial network (GAN).

* * * * *